United States Patent [19]

Sato

[11] Patent Number: 4,651,949
[45] Date of Patent: Mar. 24, 1987

[54] FISHING REEL

[75] Inventor: Jun Sato, Sakai, Japan

[73] Assignee: Shimano Industrial Company Limited, Osaka, Japan

[21] Appl. No.: 881,515

[22] Filed: Jul. 3, 1986

Related U.S. Application Data

[63] Continuation of Ser. No. 709,400, Mar. 7, 1985, abandoned.

[30] Foreign Application Priority Data

Mar. 28, 1984 [JP] Japan .............................. 59-45741[U]

[51] Int. Cl.⁴ .............................................. A01K 89/02
[52] U.S. Cl. ..................................... 242/217; 192/14; 242/84.5 R
[58] Field of Search ..................... 242/84.5 A, 84.5 R, 242/84.51 R, 84.51 A, 211, 212, 213, 214, 216, 217, 218, 219, 220; 192/14, 70.12, 70.25, 109 B

[56] References Cited

U.S. PATENT DOCUMENTS

| | | | |
|---|---|---|---|
| 1,077,461 | 11/1913 | Dutcher | 242/217 |
| 2,476,437 | 7/1949 | Whisman | 242/217 |
| 3,144,217 | 8/1964 | Wood | 242/84.5 A |
| 3,478,977 | 11/1969 | Sarah | 242/219 |
| 4,131,245 | 12/1978 | Noda | 242/217 |
| 4,516,741 | 5/1985 | Hashimoto | 242/217 |

Primary Examiner—Billy S. Taylor
Attorney, Agent, or Firm—Stevens, Davis, Miller & Mosher

[57] ABSTRACT

A fishing reel includes a spool having a pair of flanges and a drag disc which are disposed opposite to each other, with a contact plate interposed between the spool flange and the drag disc. One of the spool and drag disc is moved axially with respect to the other to transmit a driving force to the spool. The contact plate is brought into contact at a radially intermediate portion thereof with the flange or the drag disc. At the radially inward and outward portions on both sides of the contact portion of the contact plate are provided gaps into which the contact plate can be axially shifted with respect to the spool flange or the drag disc.

6 Claims, 7 Drawing Figures

FISHING REEL

This is a continuation of application Ser. No. 709,400, filed Mar. 7, 1985, and now abandoned.

FIELD OF THE INVENTION

This invention relates to a fishing reel, and more particularly to a fishing reel having a spool supported rotatably to a spool shaft and interposed between a pair of side frames, wherein a handle is operated to transmit a driving force to the spool through a drag mechanism to thereby rotate the spool to wind a fishing line thereon.

BACKGROUND OF THE INVENTION

Conventionally, this kind of fishing reel has been proposed which is so constructed that the spool shaft is supported rotatably and axially movably between the pair of side frames and rotatably supports the spool, a drag disc opposite to a flange of the spool is supported to one end of the spool shaft so as to be axially movable relative to the spool shaft, a drag washer is interposed between the drag disc and the flange, and a contact plate opposite to the drag washer is disposed between the flange and the drag disc and is held to the flange or drag disc. The spool shaft can be axially shifted to move either the drag disc or the spool axially in order to bring the contact plate into press-contact with the drag washer. As a result, a driving force caused by rotation of a handle is transmitted to the spool through the drag mechanism and a dragging force caused by the press-contact of the contact plate with the drag washer can be adjusted to adjust a resistance against free rotation of the spool.

The drag washer and contact plate in such reel come into contact with each other at respective surfaces thereof which are flat and perpendicular to the axis of the spool shaft, and the contact plate is held to the surface of the drag disc or the flange such that the contact plate is in contact over its entire surface with the drag disc. Hence, the contact plate, when held with a holding means such as a set screw, will become warped, thereby creating a problem in that the contact plate makes only partial contact with the drag washer. Also, in a case where an amount of axial displacement of the spool shaft is increased to intensify the dragging force, the drag disc subjected thereto deflects to move away from the spool flange, resulting in that the contact surfaces of the contact plate and the drag washer move at radially outward portions thereof away from each other and contact only at radially inward portions with each other, whereby full face contact is impossible.

Such partial contact caused by the strong dragging force will promote wearing at the radially inward portion more than at the radially outward portion, thereby creating a problem in that the friction area decreases and the maximum dragging force with respect to the press-contact strength also decreases.

SUMMARY OF THE INVENTION

An object of the invention is to provide a fishing reel which, when a contact plate comes into press-contact with a drag washer, allows the contact plate to deflect axially at both radially inward and outward portions so that an elastic restoring force caused by the deflection of the contact plate is used to enable the contact plate and the drag washer to make contact over their entire surfaces with each other, thereby reducing non-symmetrical wearing and increasing the dragging force with respect to the press-contact strength.

This invention is directed to an improvement in a fishing reel provided with a spool having a pair of flanges, a drag disc opposite to one flange of the spool, and a spool shaft supporting the spool or drag disc axially movable relative to each other, and is characterized by providing an annular contact plate disposed between the one flange and the drag disc, a holding means for holding the contact plate to the flange or drag disc in relation of being non-rotatable relative thereto, and a contact means which brings the contact plate into contact at a radially intermediate portion thereof with the one flange or the drag disc and which forms gaps at the radially inward and outward portions on both radial sides of the contact portion so that the contact plate can be axially shifted within the gaps with respect to the one flange or the drag disc to support the same.

Thus, the contact plate, due to the aforesaid gaps, is axially shiftable at the radially inward and outward portions thereof on both sides of the holding portion with respect to one of the flanges and the drag disc, and when in contact therewith, elastically shifts in a range of each gap, so that the restoring force caused by the elastic shift of the contact plate will bring the contact plate into full face contact with the other of the flange and drag disc, or a drag washer.

Accordingly, the contact plate and the flange, drag disc or drag washer, operating to provide press-contact therewith, can reduce non-symmetrical wearing and also perform smooth dragging.

These and other objects of the invention will become more apparent in the detailed description and examples which follow.

DETAILED DESCRIPTION OF THE INVENTION

Figure 1:
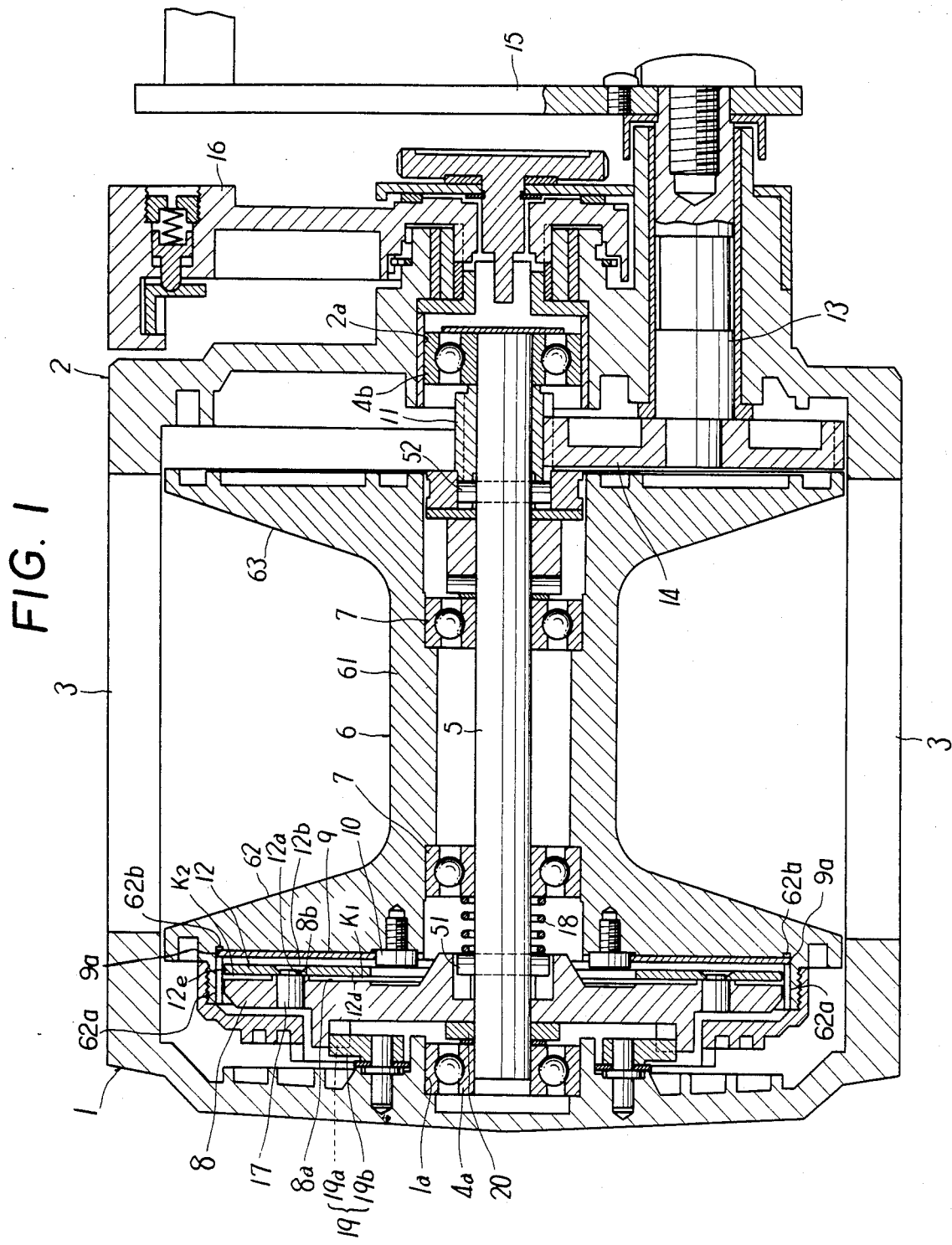
FIG. 1 is a sectional view of an embodiment of a fishing reel of the invention.

Next, a typical embodiment of the fishing reel of the invention will be described in accordance with FIG. 1, in which reference numerals 1 and 2 designate a pair of first and second side frames opposite to each other. Side frames 1 and 2 comprise disc-like members having at their centers housings 1a and 2a, respectively, and are connected at their outer peripheral portions with a plurality of connecting rods 3.

Between housings 1a and 2a at first and second side frames 1 and 2 is supported a spool shaft 5, rotatably and axially movable relative to side frames 1 and 2 through bearings 4a and 4b. A spool 6, comprising a cylindrical trunk 61 and a pair of first and second flanges 62 and 63 projecting radially outwardly from both lengthwise ends of trunk 61, is supported at an intermediate portion of shaft 5 non-axially movable relative thereto but only rotatably through a pair of bearings 7. At the axial end of spool shaft 5 disposed at the first side frame 1 side thereof, a drag disc 8 opposite to first flange 62 is supported non-rotatably but axially movably relative to spool shaft 5. A drag washer 9 is interposed between drag disc 8 and first flange 62 and supported thereto axially movably through a plurality of support screws 10. A pinion 11 is supported to the other axial end of spool shaft 5 at the second side frame 2 side thereof in relation of being non-axially movable relative to spool shaft 5. Drag disc 8 holds an annular contact plate 12 opposite to drag washer 9.

A handle shaft 13 is supported rotatably to second side frame 2 and passes therethrough to fixedly support at its inner end a master gear 14 engageable with pinion 11 and at its outer end a handle 15. A driving force therefrom is adapted to be transmitted to spool 6 through master gear 14, pinion 11, spool shaft 5, and a drag mechanism to be discussed in detail below, comprising drag disc 8, contact plate 12 and drag washer 9. A drag lever 16 is supported rotatably to second side frame 2 and is operated to shift spool shaft 5 toward first side frame 1, so that the axial movement of spool shaft 5 is transmitted to spool 6 through bearing 4b, pinion 11 and bearing 7. Hence, spool 6 is shifted together with spool shaft 5 toward first side frame 1 to bring drag washer 9 into press-contact with contact plate 12, and the driving force from spool shaft 5 is transmitted to spool 6 through the dragging force caused by the press-contact of drag washer 9 against contact plate 12.

The fishing reel of FIG. 1, constructed as described above, includes annular contact plate 12 disposed opposite to drag washer 9 and interposed between first flange 62 and drag disc 8. Contact plate 12 is held at a radially intermediate portion of its annular portion to drag disc 8 by use of holding means, such as holding pins 17, so that at both radial sides of the holding portions are provided gaps $K_1$ and $K_2$, through which contact plate 12 is shiftable axially with respect to drag disc 8.

In greater detail, drag disc 8 provides an annular surface 8a opposite to contact plate 12. A projecting surface 8b, projecting toward first flange 62, is provided at the radially intermediate portion of annular surface 8a, and holding pins 17 are mounted on projecting surface 8b to hold contact plate 12 at the radially intermediate portion thereof so as to provide gaps $K_1$ and $K_2$ between contact plate 12 and holding surface 8a, thereby enabling contact plate 12 to deflect in a range of each gap $K_1$ or $K_2$.

Contact plate 12 is provided with a plurality of bores 12a disposed circumferentially of contact plate 12 and at predetermined intervals. Bores 12a receive holding pins 17. Contact plate 12 also includes tapered recesses 12b in continuation of bores 12a respectively. Holding pins 17, after being inserted into bores 12a, are caulked at their utmost ends within recesses 12b, respectively, thereby fixedly holding contact plate 12.

In addition, drag disc 8 is made axially movable relative to first side frame 1, and a spring 18 is interposed between drag disc 8 and bearing 7 at first side frame 1 side and biases drag disc 8 and spool 6 to move away from each other. As shown in FIG. 1, drag disc 8 is substantially fixed at its central portion through bearing 4a and elastic member 20; this central portion of drag disc 8 is, however, able to move slightly relative to first side frame 1.

Also, spool shaft 5 is straight, has no stepped portion at its outer periphery, and is provided near both its axial ends, with transmission pins 51 and 52 projecting radially from spool shaft 5.

In addition, in FIG. 1, reference numeral 19 designates a sound generating mechanism comprising ratchet teeth 19a, sound generating pawls 19b, and a spring (not shown) to bias pawls 19b toward ratchet teeth 19a, and 20 designates an annular elastic member, such as a rubber ring.

In the fishing reel of the invention constructed as above-mentioned, a fishing line is wound onto spool 6 in a condition of free rotation, as shown in FIG. 1, such that drag lever 16 is turned to shift spool shaft 5 toward first side frame 1, spool 6 is moved toward drag disc 8 against the bias of spring 18, drag washer 9 supported to first flange 62 comes into press-contact with contact plate 12, and handle 15 is rotated to transmit a driving force therefrom to first flange 62 through handle shaft 13, master gear 14, pinion 11, spool shaft 5, drag disc 8, contact plate 12, and drag washer 9, thereby forcibly rotating spool 6.

Contact plate 12, which is made elastically shiftable at its aforesaid radially inward and outward portions 12d and 12e in gaps $K_1$ and $K_2$, undergoes no warp or deformation even when held to drag disc 8. Hence, contact plate 12 and drag washer 9 are kept opposite to and parallel to each other, so that even when contact plate 12 comes into press-contact with drag washer 9, to an extent of causing no deflection of drag disc 8, contact plate 12 can be brought into contact over its entire surface with drag washer 9.

Figure 2:
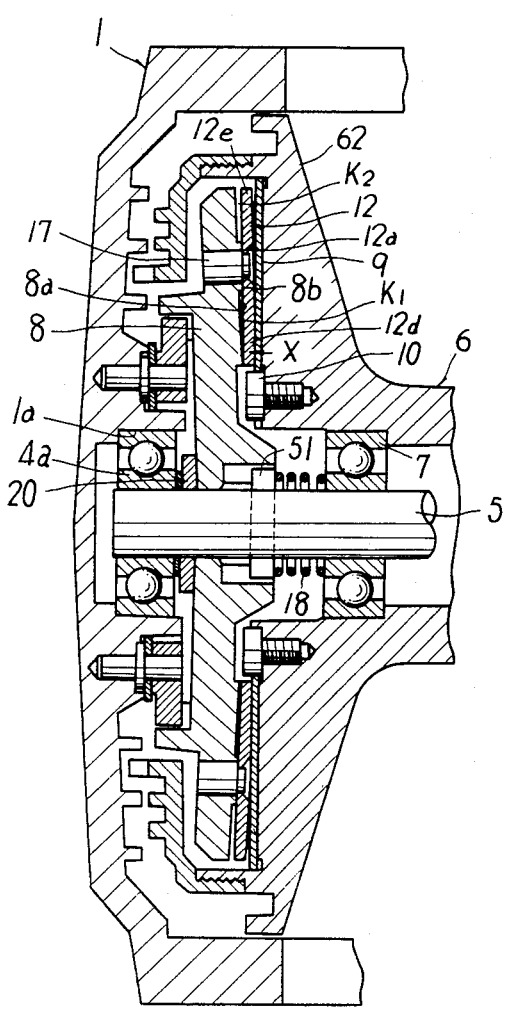
FIGS. 2 through 4 are views, each of which are explanatory of a condition of applying a resistance against free rotation of a spool.
Figure 3:
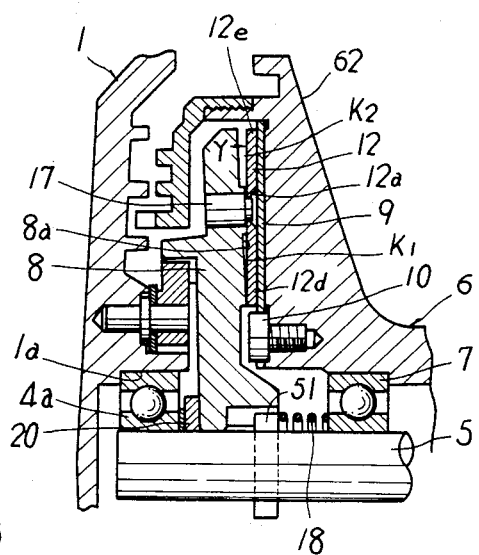
Figure 4:
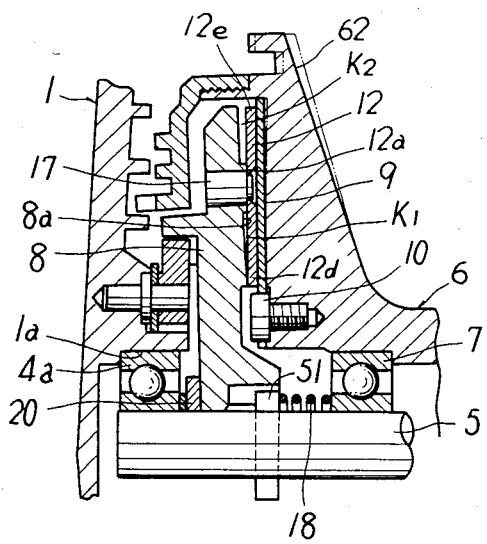

On the other hand, when the press-contact strength caused by movement of spool 6 is increased corresponding to a pull of a hooked fish, in other words, the dragging force is increased by operating drag lever 16, drag disc 8, as shown in FIG. 2, deflects away from first flange 62. At this time contact plate 12, held to drag disc 8, inclines along with drag disc 8 in the deflecting direction thereof. As a result, the surface pressure (in the direction of arrow X in FIG. 2) at the radially inward portion 12d of inclining contact plate 12 increases, while, on the contrary, the radially outward portion 12e moves away from first flange 62, but the radially inward portion 12d elastically shifts in the range of gap $K_1$, whereby the radially outward portion 12e is subjected to a reaction (in the direction of arrow Y in FIG. 3) to the press-contact strength of elastically shifting the inward portion 12d, thereby being brought into press-contact with drag washer 9. On the other hand, the fishing line to be wound onto spool 6, when subjected to a large tension caused by a pull of a hooked fish, may apply a large winding force to spool 6 to thereby cause the radially outward portion of first flange 62 to elastically shift axially outwardly. In this case, radially outward portion 12e at contact plate 12 is biased axially outwardly through drag washer 9, resulting in portion 12e elastically shifting within the range of gap $K_2$, so that the elastic restoring forces of both the radially outward and inward portions 12e, 12d allow contact plate 12 to make contact over its entire surface with drag washer 9. Hence, unsymmetrical wearing at contact plate 12 and drag washer 9 can be eliminated.

In a case where spool 6 is intended to be in a free rotation mode, drag lever 16 is turned in the reverse direction to move spool 6 away from drag disc 8 through spring 18 and spool shaft 5 toward second side frame 2.

Figure 5:
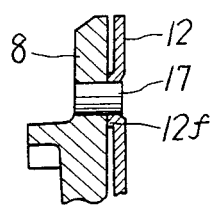
FIG. 5 is a partially sectional view of a modified embodiment of the invention.

Alternatively, contact plate 12 may, as shown in FIG. 5, be provided at a radially intermediate portion with a projection 12f, which projects axially outwardly, abuts against drag disc 8, and is held thereto through holding pins 17, thereby forming gaps $K_1$ and $K_2$, the same as in the former embodiment. Alternatively, a washer (not shown) may be formed separately from drag disc 8 and contact plate 12 so as to hold the latter to drag disc 8 through washer 9, thereby forming gaps $K_1$ and $K_2$.

Figure 6:
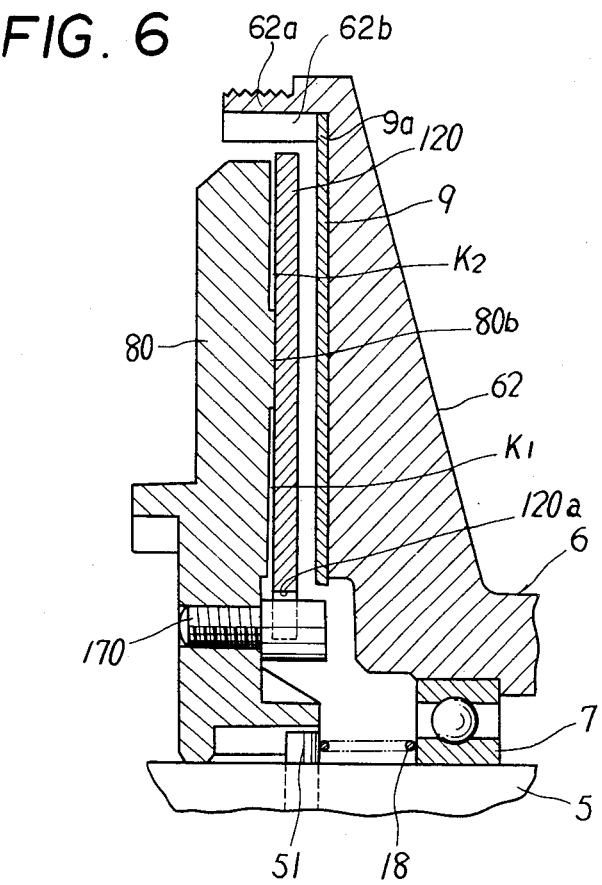
FIG. 6 is a partially sectional view of another modified embodiment of the invention.
Figure 7:
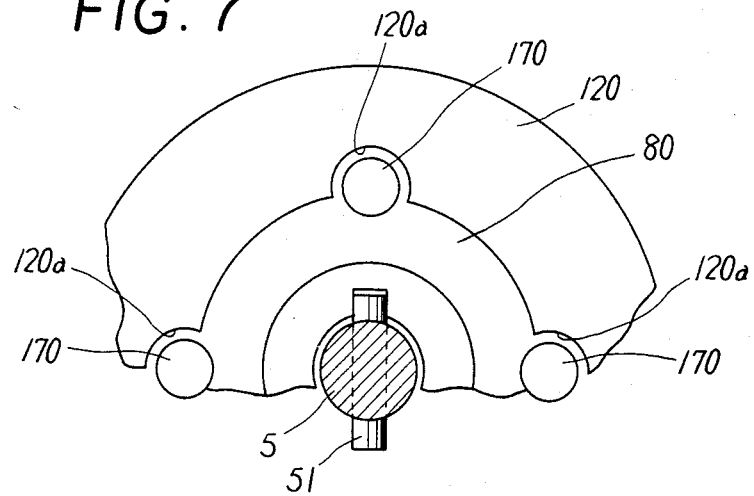
FIG. 7 is a right-hand partial side view of a contact plate and a drag disc in the FIG. 6 embodiment.

Also, the holding means for contact plate 12 may alternatively comprise a plurality of holding pins 170 projecting from the radially inward portion of drag disc 80 toward first flange 62 and disposed circumferentially of drag disc 80, as shown in FIGS. 6 and 7, and holding bores 120a provided at the inner peripheral portion of contact plate 120 and insertable freely onto pins 170, respectively. Bores 120a are inserted onto pins 170 respectively and hold contact plate 120 to drag disc 80 in relation of being non-rotatable relative thereto.

In this embodiment, at drag disc 80 or contact plate 120 (in FIGS. 6 and 7, drag disc 80) is provided an annular projection 80b in contact with contact plate 120 so that gaps $K_1$ and $K_2$ are formed on both radial sides of projection 80b. In addition, the holding means using holding pins 170 may alternatively be provided at first flange 62 to hold contact plate 120 thereto.

Also, the holding means comprising holding pins 170 holds contact plate 120 non-rotatably relative to flange 62 or drag disc 80, but does not fix the same.

Alternatively, contact plates 12 and 120 may be held to first flange 62 at spool 6.

Also, when a drag washer formed in a thin plate is held to the first flange 62 by use of a set screw, flatness of its surface opposite to contact plates 12 and 120 will be hindered. Drag washer 9 should be held to the first flange 62, not only such that it can not rotate relative thereto, as shown in the aforesaid embodiments, but also such that axial movement thereof relative to first flange 62 is not hindered. In addition, as shown in FIGS. 1 and 6, grooves 62b are provided at the inner periphery of cylindrical portion 62a so that projections 9a, extending radially outwardly from the outer periphery of drag washer 9, are fitted into grooves 62b to hold drag washer 9 non-rotatably relative to and axially movably with respect to flange 62.

Alternatively, drag disc 8 or 80 may be axially moved and contact plate 12 or 120 may be supported to drag washer 9 supported at first flange 62.

As seen from the above, the fishing reel of the invention operates such that the contact plate is brought into contact at its radially intermediate portion, with at least one of drag disc 8 and flange 62 at spool 6, and at radially inward and outward portions on both sides of the contact portion of drag disc 8 or flange 62 are provided gaps $K_1$ and $K_2$ in which the contact plate is axially shiftable, whereby the contact plate, when in contact with the drag washer or the like, elastically shifts within gaps $K_1$ and $K_2$. Hence, even when the contact plate warps, the elastic restoring force caused by the elastic shifting of the contact plate allows the contact plate to come into contact over its entire surface with the drag washer or the like. Accordingly, unsymmetrical wearing of the contact plate and the drag washer or the like is reduced and also smooth dragging is achieved.

Although several embodiments have been described, they are merely exemplary of the invention and are not to be construed as limiting, the invention being defined solely by the appended claims.

What is claimed is:

1. A fishing reel comprising:
    a spool shaft supporting a spool having a pair of flanges, at least one of said flanges comprising a drag flange,
    a drag disc opposite to said drag flange of said spool, at least one of said spool and said drag disc being axially movable relative to the other;
    an annular contact plate disposed between said drag flange and said drag disc,
    a holding means for holding said contact plate to one of said drag flange and said drag disc non-rotatably relative thereto, said one of said drag flange and said drag disc contacting said contact plate at a radially intermediate portion of said contact plate such that a radially inward gap and a radially outward gap relative to said intermediate portion are provided between said contact plate and said one of said drag flange and said drag disc, and
    a contact means for causing said contact plate to make contact at said radially intermediate portion of said contact plate with the other of said drag flange and said drag disc,
    whereby said contact plate is axially movable relative to said drag disc and said drag flange within said radially inward gap and said radially outward gap.

2. A fishing reel according to claim 1, wherein said holding means comprises an annular holding surface on said drag disc for holding said contact plate to said drag disc, said holding surface having at a radially intermediate portion thereof, a projecting surface projecting toward said drag flange of said spool, said projecting surface contacting said contact plate.

3. A fishing reel according to claim 2, wherein said projecting surface comprises a plurality of holding pins, said contact plate being held by said holding pins to contact said projecting surface.

4. A fishing reel according to claim 1, wherein said contact plate has at a radially intermediate portion thereof an axially projecting surface.

5. A fishing reel according to claim 1, wherein said holding means comprises a plurality of holding pins projecting from one of said drag flange and said drag disc and holding bores formed at one radial side of said annular contact plate, said holding pins extending into said holding bores such that said contact plate is supported freely movably with respect to said holding pins and is held non-rotatably relative to and axially movably relative to said drag flange and said drag disc.

6. A fishing reel according to claim 1, further comprising a drag washer supported adjacent to the other of said drag flange and said drag disc, said drag washer being supported such that it is non-rotatable but axially movable relative to said other of said drag flange and said drag disc.

* * * * *